United States Patent [19]

Kuwagaki et al.

[11] 4,195,917
[45] Apr. 1, 1980

[54] FOUR-LAYER DISPLAY ELECTRODE IN AN ELECTROCHROMIC DISPLAY

[75] Inventors: Hiroshi Kuwagaki, Joyo; Tadanori Hishida, Kashihara; Kohzo Yano; Yasuhiko Inami, both of Tenri, all of Japan

[73] Assignee: Sharp Kabushiki Kaisha, Osaka, Japan

[21] Appl. No.: 850,549

[22] Filed: Nov. 11, 1977

[30] Foreign Application Priority Data

Nov. 12, 1976 [JP] Japan ............................ 51/136635
Jun. 7, 1977 [JP] Japan ............................ 52/67459
Jun. 9, 1977 [JP] Japan ............................ 52/68434

[51] Int. Cl.² .............................................. G02F 1/17
[52] U.S. Cl. .................................................... 350/357
[58] Field of Search ............... 350/357, 334, 336, 339, 350/362, 363; 29/625

[56] References Cited

U.S. PATENT DOCUMENTS

| 3,981,560 | 9/1976 | Heyman et al. ...................... 350/357 |
| 4,068,927 | 1/1978 | White ..................................... 350/362 |
| 4,086,003 | 4/1978 | Kouchi et al. ........................ 350/357 |

*Primary Examiner*—James W. Davie
*Attorney, Agent, or Firm*—Birch, Stewart, Kolasch & Birch

[57] ABSTRACT

A first transparent conductive film is formed on a glass substrate. A second transparent conductive film is formed on the first transparent conductive film with intervention of a protective insulation film. The second transparent conductive film is electrically connected to the first transparent conductive film directly or through pin holes formed in the protective insulation film. An inorganic solid film which manifests the electrochromic phenomenon is formed on the second transparent conductive film.

16 Claims, 19 Drawing Figures

PRIOR ART

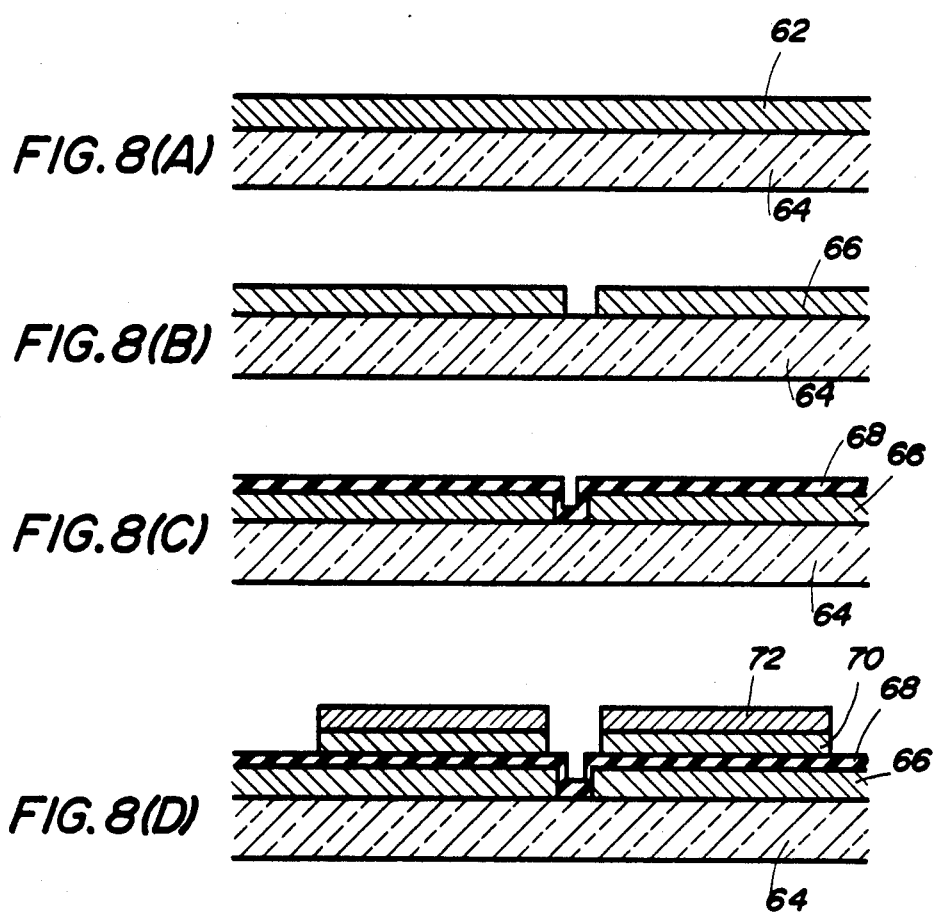

FOUR-LAYER DISPLAY ELECTRODE IN AN ELECTROCHROMIC DISPLAY

BACKGROUND OF THE INVENTION

The present invention relates to a display electrode of an electrochromic display which contains an electrochromic material held in two electrode carrying support plates, at least one of which is transparent, to manifest reversible variations in the light absorption properties when current is supplied thereto.

More specifically, the present invention relates the structure of a display electrode of an electrochromic display which includes an inorganic solid film formed on a transparent conductive film, which produces color variations by the change in its opacity.

In the above-mentioned type of the electrochromic display, the inorganic solid film, for example, a $WO_3$ film of about 1 $\mu$m thickness, defines a display pattern. The edges of the inorganic solid film should be maintained in contact with electrolyte to obtain uniform coloration or bleaching.

Lead electrodes connected to the display electrode, or, to the inorganic solid film are inevitably required. When the lead electrodes are maintained in contact with the electrolyte, there is a possibility that the lead electrodes are damaged or colored during operation of the electrochromic display. Accordingly, the lead electrodes should be coated with an electrically and chemically insulating film.

OBJECTS AND SUMMARY OF THE INVENTION

Accordingly, an object of the present invention is to provide a display electrode of an electrochromic display, which ensures clean coloration and complete bleaching.

Another object of the present invention is to protect the lead electrodes included within an electrochromic display from the electrolyte.

Still another object of the present invention is to provide an electrochromic display which ensures stable operation.

Yet another object of the present invention is to provide an electrochromic display cell suited for mass production.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a display electrode has a four-layer construction to accurately define the edges of the display pattern and to protect the lead electrodes from the electrolyte.

More specifically, a first transparent conductive film is formed on a glass substrate. A protective insulation film is formed on the first transparent conductive film to electrically and chemically isolate the first transparent conductive film from the electrolyte contained in the electrochromic display cell. A second transparent conductive film is formed on the protective insulation film to define the actual display electrode, and an inorganic solid film, for example, a $WO_3$ film of about 1 $\mu$m thickness is formed on the second transparent conductive film. The second transparent conductive film is electrically connected to the first transparent conductive film directly or through pin holes formed in the protective insulation film.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

FIGS. 8(A) through 8(D) are sectional views showing fabrication steps of still another embodiment of a display electrode of the present invention.

DESCRIPTION OF THE PREFERRED EMBODIMENTS

Referring now in detail to the drawings, and to facilitate a more complete understanding of the present invention, the basic structure of an electrochromic display cell will be first described with reference to FIG. 1.

Figure 1:
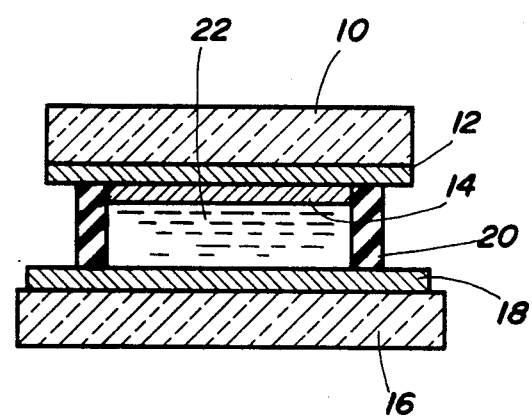
FIG. 1 is a cross sectional view of the basic structure of an electrochromic display cell.

The electrochromic display cell of FIG. 1 employs an inorganic solid film which produces the color variation upon receiving properly controlled electric current. The electrochromic display cell mainly comprises a transparent glass substrate 10, a transparent electrode 12 and an inorganic solid film 14, which manifests the electrochromic phenomenon, formed on the transparent electrode 12. The transparent electrode 12 is made of an indium oxide film. The electrochromic display cell further comprises a glass substrate 16 carrying a transparent electrode 18 made of an indium oxide film, a spacer 20, and an electrolyte 22 filled between two glass substrates 10 and 16.

The inorganic film 14 most commonly used for electrocoloration is $WO_3$ with thickness of about 1 $\mu$m. The electrolyte 22 is a mixture of sulfuric acid, an organic alcohol such as glycerol, and a fine white powder such as $TiO_2$. The alcohol is added to dilute the acid and the pigment is used to provide a white reflective background for the coloration phenomenon. The thickness of the liquid is usually about 1 mm.

The amorphous $WO_3$ film is colored blue when the transparent electrode 12 is made negative with respect to the counter electrode 18. The applied voltage is several volts. The blue color is diminished or bleached when the polarity of the applied voltage is reversed. This is termed bleaching.

The coloration of the film apparently is produced by the injection of electrons and protons into the $WO_3$ film.

Bleaching occurs because the electrons and protons are returned to their respective starting electrons when the polarity is reversed. The colored state is maintained for several days after removal of the coloration voltage as long as the bleaching voltage is not applied (memory effects).

Although the operating principle of ECDs has been discussed above, ECDs have the following characteristic features.

(1). The viewing angle is extremely wide (2). for a single cycle of coloration/bleaching the power dissipation is from several through several tens mj/cm$^2$, and the total power dissipation is proportional to the number of the repetition cycles (3). memory effects are expected, which maintains the coloration state for several hours through several days after the coloration voltage is removed as long as ECDs are held in an electrically opened state. Of course, the memory effects require no externally supplied power.

Figure 2:
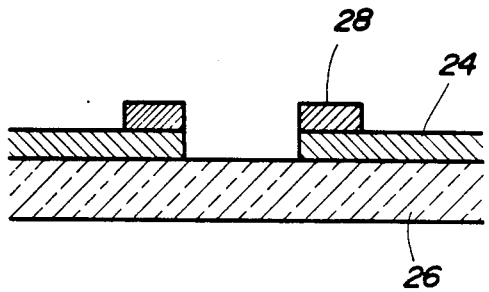
FIG. 2 is a cross sectional view of a display electrode employed in the conventional electrochromic display cell.

FIG. 2 shows a conventional display electrode sutructure, which is disclosed in, for example, B. W. Faughnan et al., RCA Rev. 36,177 (1975).

A transparent electrode 24 is formed on a transparent substrate 26, and an inorganic solid film 28 is formed on the transparent electrode 24 so as to define a display pattern.

Fabrication steps of the display electrode of FIG. 2 are as follows:

The transparent electrode 24 made of an indium oxide film including $SnO_2$ as impurities is formed on a glass substrate or a plastic substrate through the use of vacuum evaporation techniques. Or, the transparent electrode 24 made of $SnO_2$ including $Sb_2O_3$ as impurities, namely, a NESA film, is formed on a glass substrate through a spray method. A desired electrode pattern is formed through an etching method in combination with photo-resist techniques or a screen printing method.

The inorganic solid film 28 such as a $WO_3$ film is formed on the transparent electrode 24 through the use of evaporation techniques or a spattering method, and shaped in a desired configuration through the use of an etching method in combination with photo-resist techniques or a screen printing method.

In the case where the inorganic solid film is formed before the transparent electrode is etched in a desired configuration, the inorganic solid film and the transparent electrode can be etched through the use of a same mask (a photo-resist layer or an epoxy resin layer) when the lead electrode portion is previously formed by removing the inorganic solid film through the use of a mask evaporation method or an etching method. This will provide a clean edge of a display electrode.

The above-mentioned conventional display electrode shown in FIG. 2 is easily fabricated. However, at the lead electrode portion, the transparent electrode 24 is maintained in contact with the electrolyte and, therefore, the transparent electrode 24 will be damaged during operation. Moreover, there is a possibility that the lead electrode portion is colored during operation.

Figure 3:
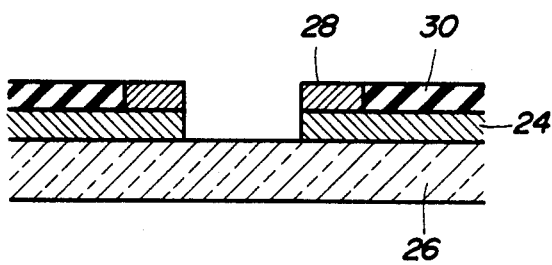
FIGS. 3 through 5 are sectional views of a display electrode of various approaches to minimize defects of the display electrode of FIG. 2.
Figure 4:
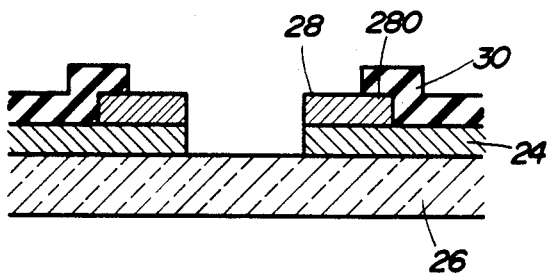
Figure 5:
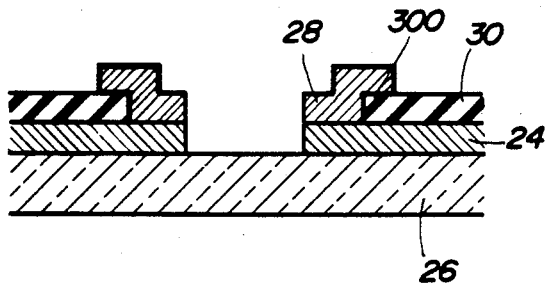

In order to minimize the above-mentioned defects, three kinds of approaches have been considered. FIGS. 3 through 5 show the three approaches. Like elements corresponding to those of FIG. 2 are indicated by like numerals.

In the device of FIG. 3, a protective insulation layer 30 is formed on the transparent electrode 24 at the lead electrode portion. The protective insulation layer 30 functions to electrically and chemically isolate the transparent electrode 24 from the electrolyte at the lead electrode portion. However, such an accurate positioning of the inorganic solid film 28 and the protective insulation layer 30 is not easily achieved and, therefore, the device of FIG. 3 is not suited for mass production.

In the device of FIG. 4, the protective insulation layer 30 is formed on the transparent electrode 24 in such a manner that a portion 280 of the inorganic solid film 28 is covered by the protective insulation layer 30. The protective insulation layer 30 can be made of a $SiO_x$(X=1-2) film formed through a mask evaporation method, or an epoxy resin film or a silicon resin film formed through a screen printing method.

Fabrication of the device shown in FIG. 4 is easy. However, the device of FIG. 4 has the following defects.

The portion 280 of the inorganic solid film 28 is not colored since positive ions are not injected into the portion 280. However, the portion 280 is gradually colored due to distribution of color species formed in the inorganic solid film 28. Moreover, the thus formed coloration of the portion 280 will not be removed even when the bleaching operation is conducted. A typical distribution velocity of the color species is about 1 mm/hour when the coloration is conducted under the following conditions.

transparent electrode: $In_2O_3$ formed through vacuum evaporation;
inorganic solid film: $WO_3$ film of 5000 Å thickness;
insulation layer: epoxy resin;
electrolyte: mixture of 1.0 M/l lithium perchloride and 2-ethoxy ethyl acetate;
coloration current: 10 mC/cm$^2$ (contrast 1:10).

In the device of FIG. 5, the inorganic solid film 28 is formed on the transparent electrode 24 in such a manner that a portion 300 of the protective insulation layer 30 is covered by the inorganic solid film 28. In this device, the transparent electrode 24 is firstly formed on the glass substrate 26 in a desired configuration. Thereafter, the protective insulation layer 30 made of $SiO_x$(X=1-2) or $Al_2O_3$ is formed on the transparent electrode 24 through the use of a vacuum mask evaporation method. Then, the inorganic solid film 28 is formed on the transparent electrode 24 and on the protective insulation layer 30 through evaporation, and shaped in a desired configuration through an etching method.

The fabrication of the device of FIG. 5 is very complicated since the configuration of the inorganic solid film 28 must accurately conform to that of the transparent electrode 24. Moreover, the inorganic solid film 28 formed on the portion 300 of the protective insulation layer 30 is not easily bleached once it is colored.

FIGS. 6(A) through 6(E) show fabrication steps of an embodiment of a display electrode of the present invention.

Figure 6A:
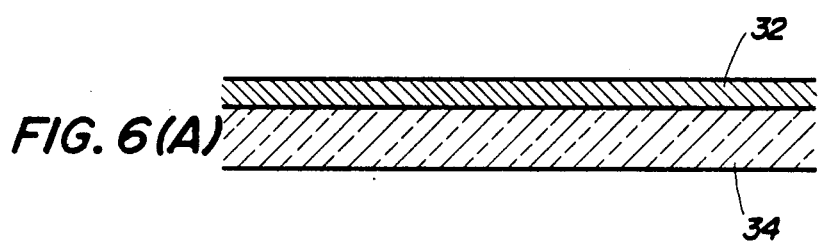
FIGS. 6(A) through 6(E) are sectional views showing fabrication steps of an embodiment of a display electrode of the present invention.
Figure 6B:
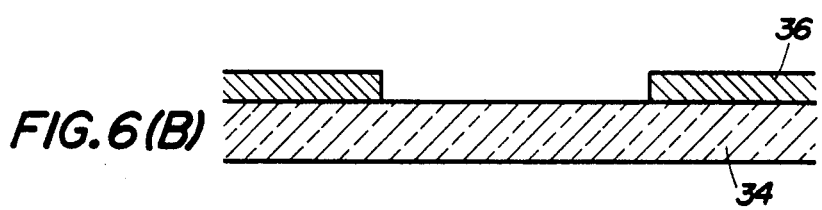

An indium oxide transparent conductive film 32 is formed on a transparent glass substrate 34 as shown in FIG. 6(A) through the use of an evaporation method.

A desired pattern is formed on the indium oxide transparent conductive film 32 by the photo-resist or resist-ink. The indium oxide transparent conductive film 32 is etched by hydrochloric acid and shaped in a desired pattern. The thus shaped conductive film 36 shown in FIG. 6(B) and functions as lead electrodes.

Figure 6C:
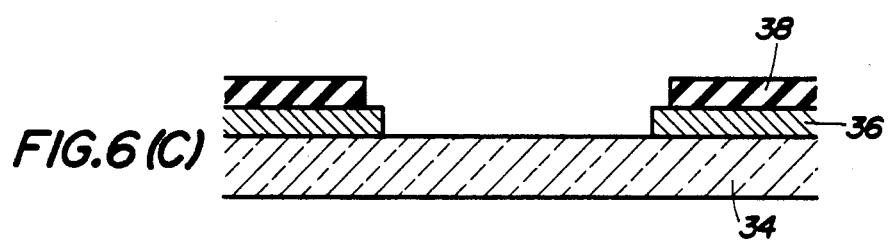

A protective insulation layer 38 made of $SiO_x$(X=1-2) or $Al_2O_3$ is formed on the lead electrodes 36 as shown in FIG. 6(C) through the use of a mask evaporation method. The end of the lead electrodes 36 should be exposed to the outside.

Figure 6D:
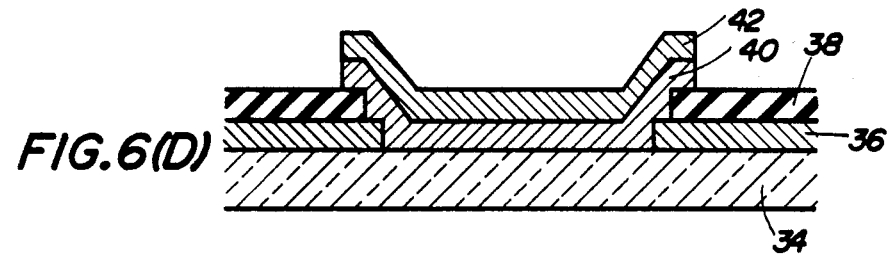

An indium oxide transparent conductive film 40 and an inorganic solid film 42 made of $WO_3$ are formed on the glass substrate 34 as shown in FIG. 6(D). The conductive film 40 is connected to the end of the conductive film 36.

Figure 6E:
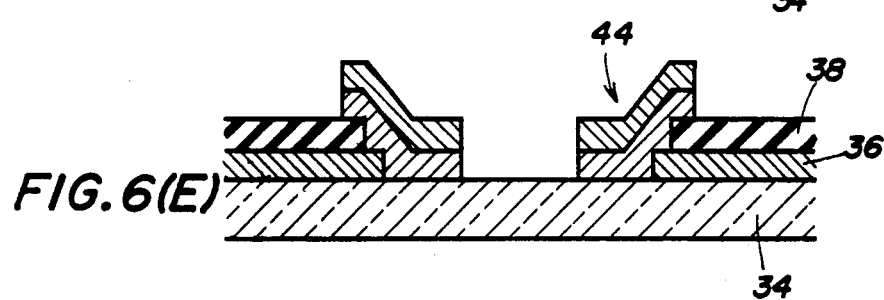

A display electrode pattern is formed by the photo-resist or the resist-ink, and the $WO_3$ film 42 and the indium oxide film 40 are etched by alkali liquid and hydrochloric acid, respectively, thereby forming display electrodes 44 as shown in FIG. 6(E).

The protective insulation layer 38 can be made of $MgF_2$, $CaF_2$, $TiO_2$, $Si_3N_4$ or $Y_2O_3$.

FIGS. 7(A) through 7(E) show fabrication steps of another embodiment of a display electrode of the present invention.

Figure 7A:
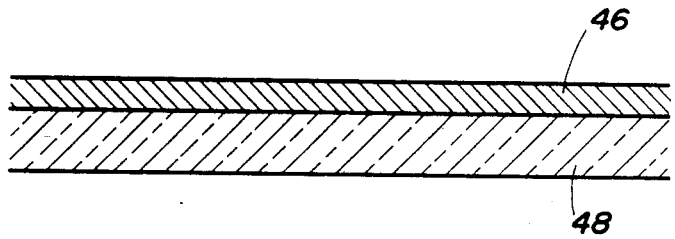
FIGS. 7(A) through 7(E) are sectional views showing fabrication steps of another embodiment of a display electrode of the present invention.
Figure 7B:
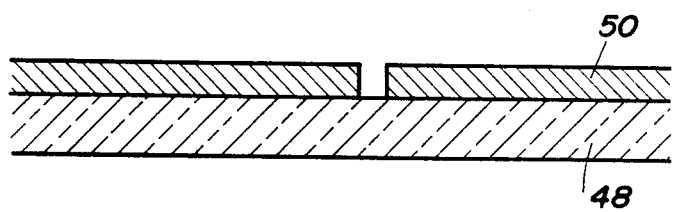

An indium oxide transparent conductive film 46 is formed on a transparent glass substrate 48 as shown in FIG. 7(A) through the use of evaporation techniques.

A desired pattern is formed on the indium oxide transparent conductive film 46 by the photo-resist or resist-ink. The indium oxide transparent conductive film 46 is etched by hydrochloric acid and shaped in a desired configuration. The thus shaped conductive film 50 shown in FIG. 7(B) functions as lead electrodes and bases of the display electrodes.

Figure 7C:
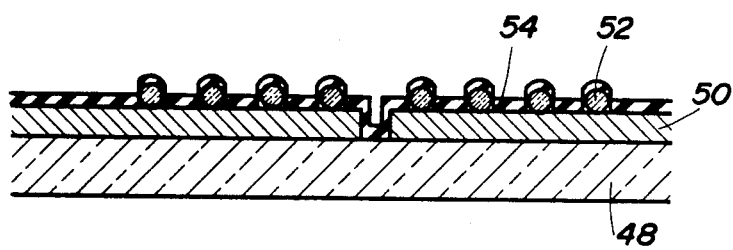

Glass fiber powder 52 is distributed on the conductive film 50 at the position corresponding to the display electrode through the use of a suitable mask. The glass fiber powder 52 has a size 6 $\mu m\phi \times 20-50$ $\mu m$ length. The glass fiber powder is distributed in a density of ten(10) particles per five hundred(500) $\mu m$ square. A protective insulation layer 54 made of $SiO_X(X=1-2)$ or $Al_2O_3$ is formed on the entire surface of the glass substrate to a thickness of 3500 Å as shown in FIG. 7(C) through the use of evaporation techniques.

Figure 7D:
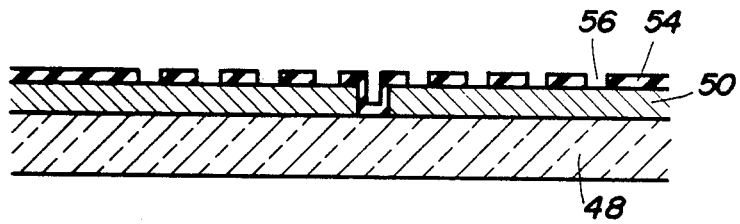

The glass fiber powder 52 is removed by applying vibration to the glass substrate 48, whereby the protective insulation layer 54 having micro openings 56 at the display electrode section is formed as shown in FIG. 7(D).

Figure 7E:
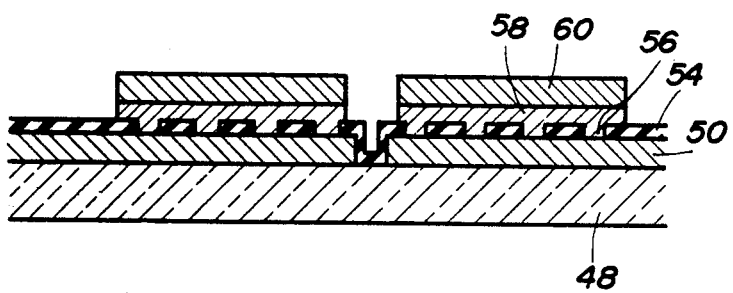

An indium oxide transparent conductive film 58 and an inorganic solid film 60 made of $WO_3$ or molybdenum oxide are formed at the display electrode portion by evaporation through the use a same pattern mask as shown in FIG. 7(E). The indium oxide transparent conductive film 58 is electrically connected to the conductive film 50 through the micro openings 56 formed in the protective insulation layer 54.

The micro openings 56 can be formed through the use of powder of $Al_2O_3$, $MgO$, $Fe_2O_3$, $BaO$, $TiO_2$ and $BaSO_4$ instead of the glass fiber powder.

FIGS. 8(A) through 8(D) show fabrication steps of still another embodiment of a display electrode of the present invention.

An indium oxide transparent conductive film 62 is formed on the entire surface of a transparent glass substrate 64 as shown in FIG. 8(A) through the use of evaporation techniques.

A desired negative pattern is formed on the indium oxide transparent conductive film 62 by the photo-resist or resist-ink. The indium oxide transparent conductive film 62 is etched by hydrochloric acid and shaped in a desired configuration. The thus shaped conductive film 66 shown in FIG. 8(B) functions as lead electrodes and bases of display electrodes.

A protective insulation layer 68 made of $SiO_X(X=1-2)$, $Al_2O_3$, $MgF_2$, $CaF_2$, $TiO_2$, $Si_3N_4$ or $Y_2O_3$ is formed on the entire surface of the glass substrate 64 to a thickness of 3500 Å as shown in FIG. 8(C) through the use of a vacuum evaporation method.

An indium oxide transparent conductive film 70 and an inorganic solid film 72 made of $WO_3$ or molybdenum oxide are formed successively at the display electrode portion by evaporation through the use of a same pattern mask as shown in FIG. 8(D).

Pin holes are unavoidably created in the protective insulation layer 68 because the protective insulation layer 68 is very thin and is not very dense. Moreover, the pin holes are created by shadowing due to evaporation angles. Therefore, the conductive film 70 is electrically communicated to the conductive film 66 through the pin holes formed in the protective insulation layer 68.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electrochromic display device including an electrochromic material held between two electrode carrying support plates, at least one of which is transparent and and carrying a display electrode means thereon, the latter manifesting reversible variations in light absorption properties upon current being supplied thereto, said disply electrode means comprising:
    a first transparent conductive layer formed on selected portions of said transparent plate;
    a protective insulation layer formed on selected portions of said first transparent conductive layer;
    a second transparent conductive layer formed on adjacent portions of said protective insulation layer and said first transparent conductive layer, said second transparent conductive layer being in electrical communication with said first transparent conductive layer; and
    an inorganic solid film means formed on substantially the entire surface of said second transparent conductive layer for exhibiting a coloration effect in response to the application of current to said first transparent conductive layer.

2. The electrochromic display device of claim 1, wherein said second transparent conductive layer and said inorganic solid film are shaped in a desired configuration to define a display pattern.

3. The electrochromic display device of claim 2, wherein said first transparent conductive layer is shaped to define a lead electrode for driving said display electrode means.

4. The electrochromic display device of claim 3, wherein an end of said first transparent conductive layer is not covered by said protective insulation layer; and said second transparent conductive layer is connected directly to said end of said first transparent conductive layer.

5. The electrochromic display device of claim 3, wherein said protective insulation layer is formed on the entire surface of said transparent plate, portions of said insulation layer having a plurality of micro openings in a particular configuration corresponding to a desired display configuration of said display electrode means.

6. The electrochromic display device of claim 3, wherein said protective insulation layer is formed on the entire surface of said transparent plate, said insulating layer having pin holes formed therein, and said second transparent conductive layer is placed in electrical communication with said first transparent conductive layer through said pin holes formed in said protective insulation layer.

7. The electrochromic display device of claim 1, wherein said protective insulation layer comprises an electrically and chemically insulating film.

8. The electrochromic display device of claim 7, wherein said protective insulation layer is a film selected from the group consisting of a $SiO_2$ film, and an $Al_2O_3$ film.

9. The electrochromic display device of claim 1, wherein said first and second transparent conductive layers are evaporated indium oxide layers.

10. The electrochromic display device of claim 1, wherein said inorganic solid film is a film selected from the group consisting of a $WO_3$ film and a molybdenum oxide film.

11. A display electrode means for an electrochromic display device said electrochromic display device including at least one transparent substrate, said display electrode means comprising:
 a first conductive layer formed on a selected portion of said transparent substrate;
 a protective insulation layer formed on a selected portion of said first conductive layer, said protective insulation layer having pin holes formed therein;
 a second conductive layer formed on a selected portion of said protective insulation layer, said second conductive layer being in electrical communication with said first conductive layer via said pin holes formed in said protective insulation layer; and
 an inorganic solid film formed on substantially the entire surface of said second conductive layer.

12. The display electrode of claim 11, wherein said second conductive layer and said inorganic solid film are shaped in a desired configuration to define a display pattern.

13. The display electrode of claim 12, wherein said substrate, said first and second conductive layers and said protective insulation layer are transparent.

14. The display electrode of claim 11, wherein said protective insulation layer is formed on the entire surface comprised of said first conductive layer and said substrate.

15. The display electrode of claim 11, wherein said protective insulation layer has a thickness of about 3500 Å.

16. The display electrode of claim 15, wherein said protective insulation layer is a film selected from the group consisting of SiO, $SiO_2$, $Al_2O_3$, $MgF_2$, $CaF_2$, $TiO_2$, $Si_3N_4$, and $Y_2O_3$.

* * * * *